Patented Jan. 7, 1930

1,742,508

UNITED STATES PATENT OFFICE

CLARENCE I. B. HENNING AND CHARLES E. BURKE, OF WILMINGTON, DELAWARE, AND EBENEZER EMMET REID, OF BALTIMORE, MARYLAND, ASSIGNORS TO E. I. DU PONT DE NEMOURS & COMPANY, OF WILMINGTON, DELAWARE, A CORPORATION OF DELAWARE

VARNISH

No Drawing. Original application filed September 24, 1924, Serial No. 739,689. Divided and this application filed July 30, 1928. Serial No. 296,410.

This invention relates to new compositions of matter including heavy metal salts of a monoalkyl or monoaryl ester of phthalic acid. These new salts are characterized by containing the following atomic grouping:

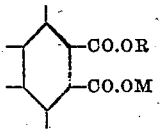

the neutral salts having the following general graphical formula:

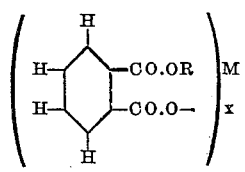

where R represents an alkyli or aryl radical preferably not containing more than one ring of carbon atoms such, for example, as methyl ($CH_3-$), ethyl ($C_2H_5-$), cyclo-hexyl ($C_6H_{11}-$), benzyl ($C_7H_7-$), phenyl ($C_6H_5-$), etc.; M represents the radical of a heavy metal such as iron, zinc, manganese, etc.; and x stands for the number of effective valencies of said metal.

By the expression "heavy metal" we mean to include, in addition to the metals mentioned above, copper, tin, lead, mercury, nickel, cobalt, silver, gold, and platinum and their equivalents.

Compounds of this general type may be readily prepared by intimately mixing an aqueous solution of the sodium salt of the monoalkyl phthalic acid with a solution of a soluble salt of a corresponding heavy metal, in which case the metal phthalic ester precipitates and can be separated from the supernatant liquid. If desired the compounds so prepared can be further purified by dissolving in ether, filtering any insoluble residue and then distilling off the ether.

The ferrous and ferric neutral salts of the monoalkyl esters of phthalic acid (such as the salts of the n-butyl ester) are brownish red compounds; the corresponding zinc, mercurous, mercuric, plumbous, and stannous salts are colorless; the corresponding manganous and nickel (ous) salts are greenish; and the corresponding cobaltous and cupric salts are blue. All these salts exist, at least initially, in the form of viscous oils, except the manganese and copper salts, which are crystalline at ordinary room temperatures. The ferric and mercuric salts are somewhat unstable, and the plumbous and stannous salts are also unstable at ordinary temperatures in the presence of water. The zinc salt is unstable at temperatures above 100° C.

The colors of the iron, cobalt, and nickel salts of the monoalkyl esters of phthalic acid, and the colors of films, such as nitrocellulose films, containing these salts, are remarkably fast to both visible and ultra-violet light.

We have discovered that compounds of this type are soluble in many organic solvents such as ether and acetone, and render available an excellent method of intimately incorporating compounds containing the heavy metals with other organic substances where they may function, for example as drying agents in paints and varnishes, or as catalytic agents in the carrying out of other chemical reactions, as for example, hydrogenation.

As an example of the use of one of these organo-metallic compounds as a drier in varnish, the following example might be given:

China wood oil_____ 50 gals.
Linseed oil_____ 12.5 gals.
Rosin_____ 120 lbs.
Turpentine_____ 125 gals.
Cobalt butyl phthalate_____ 1.22 lbs.

The cobalt butyl phthalate, being very soluble in turpentine and oil, is very readily incorporated in the mixture; and varnish so prepared is found to have satisfactory dry qualities.

This application is a division of our application Serial No. 739,689 filed September 24, 1924.

We claim:

1. An oil type varnish containing a salt of a member of the group which consists of iron, zinc, manganese, copper, tin, lead, mercury, nickel, cobalt, silver, gold, and platinum and a monoalkyl ester of phthalic acid which salt is soluble in acetone.

2. An oil type varnish containing a salt of a member of the group which consists of iron, zinc, manganese, copper, tin, lead, mercury, nickel, cobalt, silver, gold, and platinum and the butyl half ester of phthalic acid which salt is soluble in acetone.

3. An oil type varnish containing the cobalt salt of the butyl half ester of phthalic acid which is soluble in acetone.

4. An oil type varnish in which the drier is a salt of a member of the group which consists of iron, zinc, manganese, copper, tin, lead, mercury, nickel, cobalt, silver, gold, and platinum and a monoalkyl ester of phthalic acid which salt is soluble in acetone.

5. An oil type varnish in which the drier is a salt of a member of the group which consists of iron, zinc, manganese, copper, tin, lead, mercury, nickel, cobalt, silver, gold, and platinum and the butyl half ester of phthalic acid which salt is soluble in acetone.

6. An oil type varnish in which the drier is the cobalt salt of the butyl half ester of phthalic acid which is soluble in acetone.

7. A varnish containing China wood oil, linseed oil, rosin, turpentine and a salt of a member of the group which consists of iron, zinc, manganese, copper, tin, lead, mercury, nickel, cobalt, silver, gold, and platinum and a monoalkyl ester of phthalic acid which salt is soluble in turpentine and oil.

8. A varnish containing China wood oil, linseed oil, rosin, turpentine and a salt of a member of the group which consists of iron, zinc, manganese, copper, tin, lead, mercury, nickel, cobalt, silver, gold, and platinum and the butyl half ester of phthalic acid which salt is soluble in turpentine and oil.

9. A varnish containing China wood oil, linseed oil, rosin, turpentine and the cobalt salt of the butyl half ester of phthalic acid which is soluble in turpentine and oil.

In testimony whereof we affix our signatures.

CLARENCE I. B. HENNING.
CHARLES E. BURKE.
EBENEZER EMMET REID.